Figure 1:
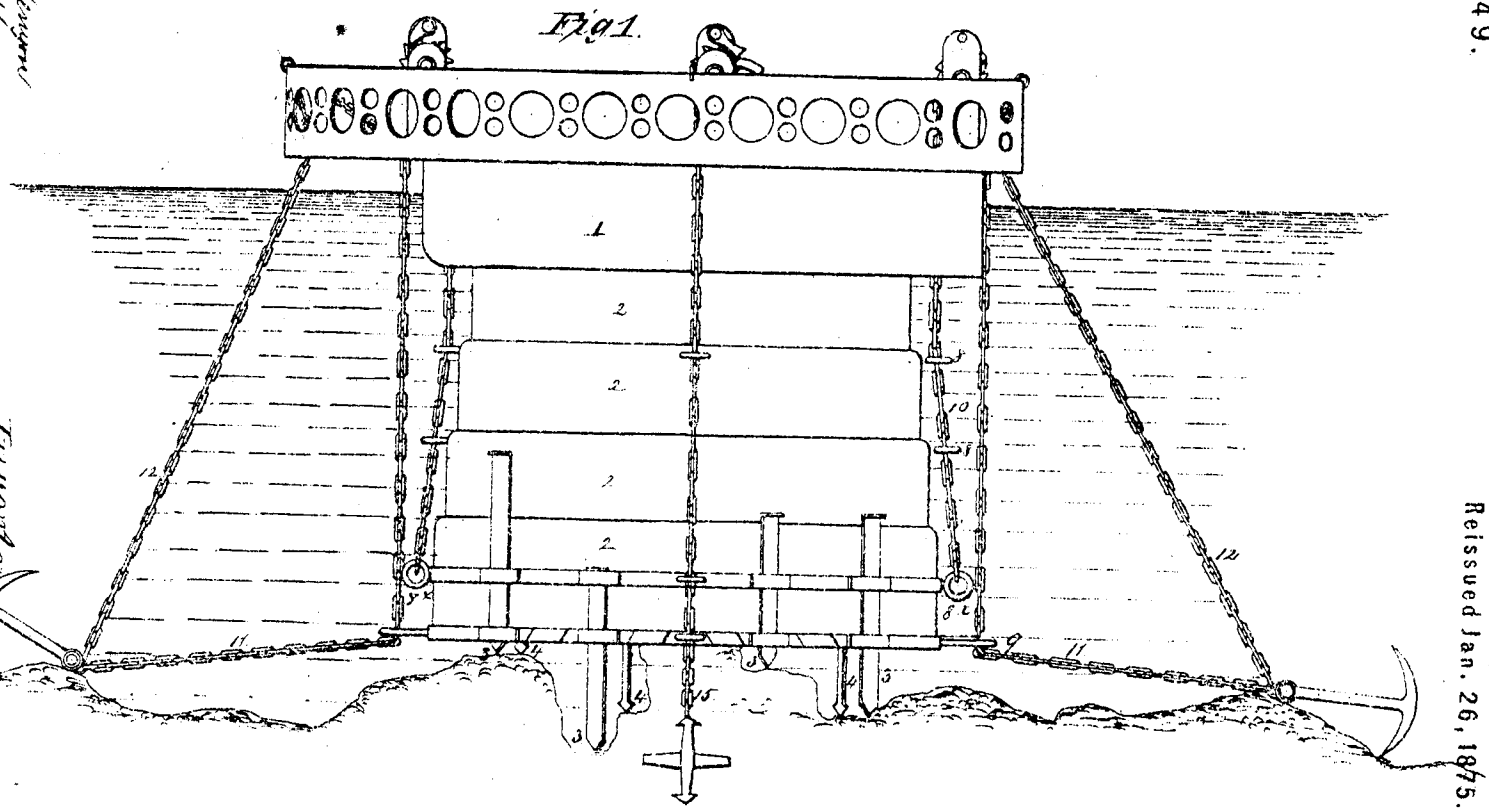

4 Sheets--Sheet 1.

S. LEWIS.

Apparatus for Removing Obstructions Under Water.

No. 6,249.

Reissued Jan. 26, 1875.

Attest:
James P. Kenyon
C. Sparks

Inventor:
Samuel Lewis,

4 Sheets--Sheet 2.

S. LEWIS.

Apparatus for Removing Obstructions Under Water.

No. 6,249.

Reissued Jan. 26, 1875.

Attest:
James P. Kenyon.
C. A. Parker

Inventor:
Samuel Lewis

S. LEWIS.
Apparatus for Removing Obstructions Under Water.
No. 6,249. Reissued Jan. 26, 1875.
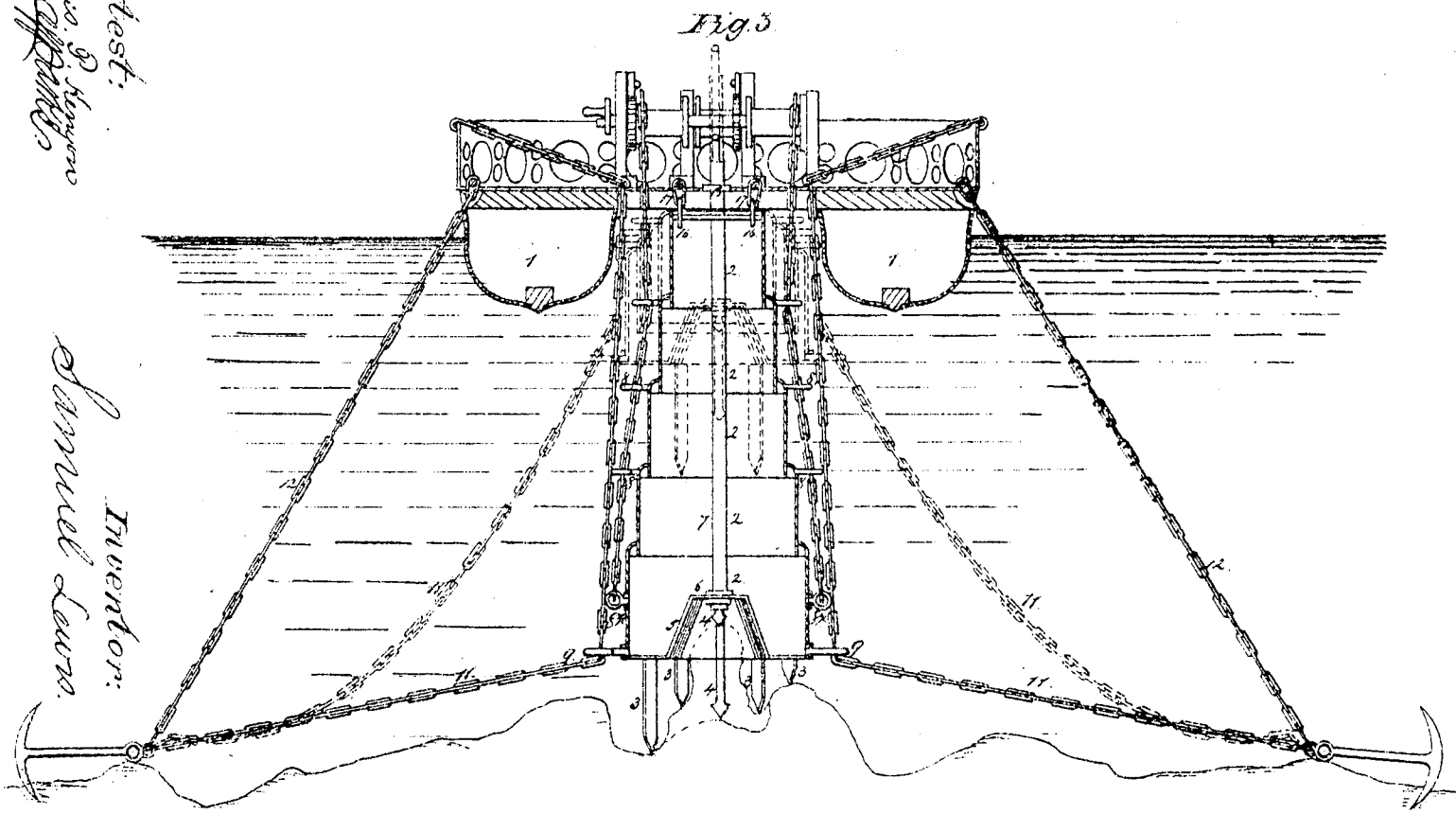
Attest:
James P. Kenyon
C. Parks
Inventor:
Samuel Lewis.

4 Sheets--Sheet 4.
S. LEWIS.
Apparatus for Removing Obstructions Under Water.
No. 6,249. Reissued Jan. 26, 1875
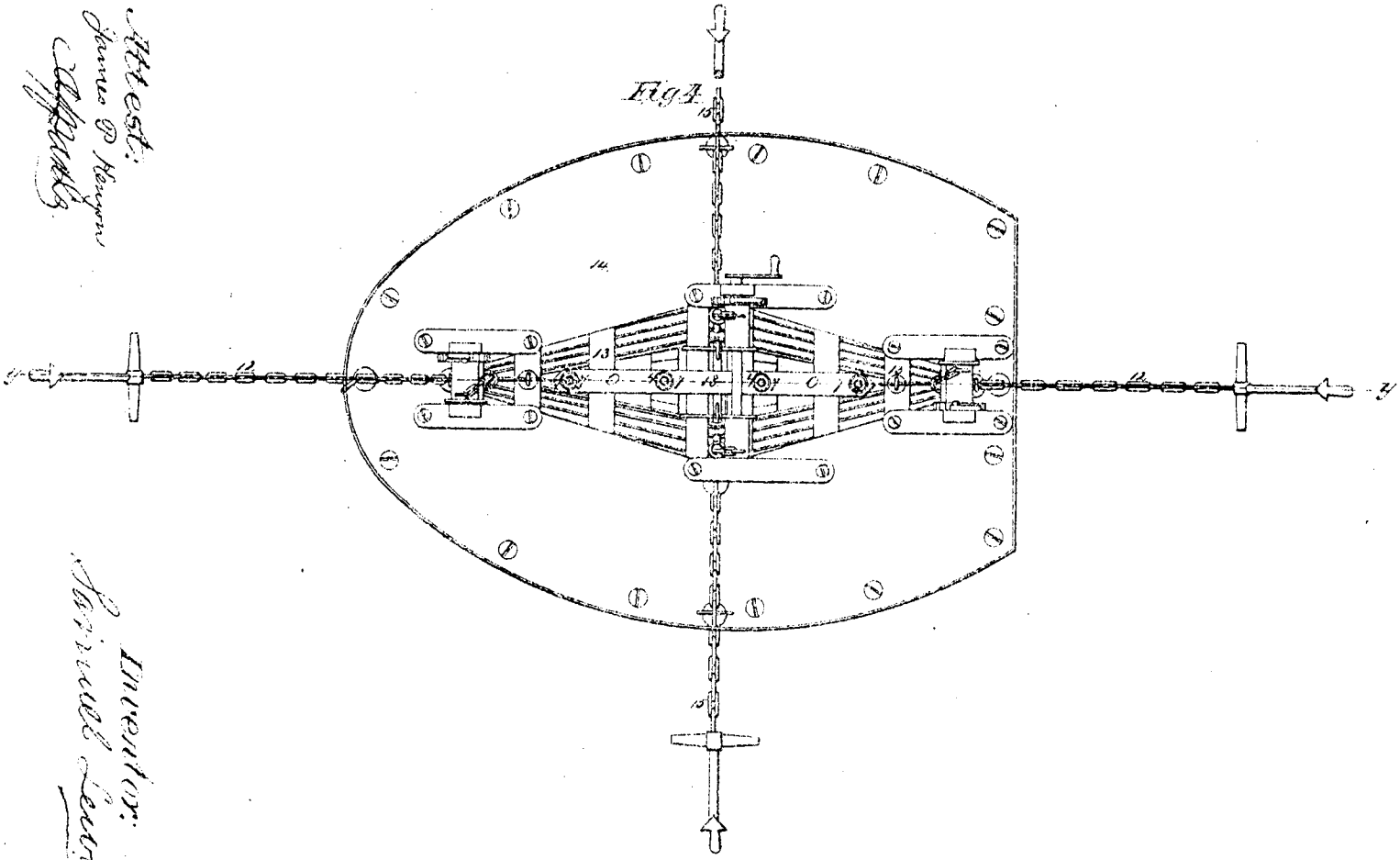
Attest:
James P. Kenyon
A. Pratz
Inventor:
Samuel Lewis.

6,249. APPARATUS FOR REMOVING OBSTRUCTIONS UNDER WATER. Saml. Lewis, Williamsburg, N. Y., assignor, by mesne assignments, of one-half interest to Wm. H. Cammeyer. Patent No. 80,492, dated July 28, 1868. [Filed July 20, 1874.]

*To all whom it may concern:*

Be it known that I, SAMUEL LEWIS, of Williamsburg, in the county of Kings and State of New York, have invented certain Improvements in Apparatus for Removing Obstructions under Water, of which the following is a specification:

This invention is chiefly designed to be used for the removal of obstructions under water in tideways or currents, though the whole, or at least some portions thereof, may be used with advantage in the removal of rock in still water.

The class of obstructions under water to the removal of which it is more particularly adapted is submerged rock, though there may be other obstructions in the removal of which its use may be found beneficial.

One part of this invention relates to the construction of a dam, inclosure, or breakwater, adapted to shield the place of operations, which dam, inclosure, or breakwater shall be portable—that is to say, capable of being removed from place to place, and also capable of being adjusted to the depth of water in which it may be used, or to adapt it to be more conveniently removed from one place to another, as occasion may require, or to adapt it to the rise and fall of the tide when used in a tideway—and which dam, inclosure, or breakwater shall also be adapted to check the flow of the current, and thus protect the operators and operations, to some extent, at least, from the effects of such current.

This portion of the invention consists in the construction of the said dam, inclosure, or breakwater in sections, entering one within another vertically, and having a capacity for movement within each other vertically, by a movement similar to that of pushing in or drawing out the joints of a telescope, so that the height of the dam, inclosure, or breakwater may be increased or diminished by diminishing or increasing the entrance of one section within another in the manner above suggested.

Another part of said invention relates to a device designed to add to the security in position of a portable dam, inclosure, or breakwater, when in position for operations; and consists in the combination, with a portable dam, inclosure, or breakwater, of self-adjusting or adjustable anchors, adapted to fit vertically into inequalities or crevices in the rock or bottom of the channel or tideway, and hold, or aid in holding, said dam, inclosure, or breakwater in position, substantially as hereinafter more fully set forth.

Another part of said invention relates to the arrangement of an open floating deck, in relation to a portable submarine dam, inclosure, or breakwater; and consists in arranging such open deck, with the opening therein, over the space inclosed or protected by the said submarine dam, inclosure, or breakwater, which arrangement enables operations necessary to be carried on within the said dam, inclosure, or breakwater, to be carried on through the opening in the said deck, substantially as hereinafter more fully set forth.

Another part of said invention consists in the combination, with a portable dam, inclosure, or breakwater, of a drill-support or drill-frame attached thereto, whereby the one is made capable of supporting the other, substantially as hereinafter more fully set forth.

Another part of said invention consists in the arrangement, in the lower portion or section of a submarine dam, inclosure, or breakwater, of a drill-support or drill-frame attached thereto.

Another part of said invention consists in the combination, with a floating deck or floor supported above the water, of a submerged drill-frame, arranged directly under said deck or floor, or under an opening through it, substantially as hereinafter set forth.

Another part of said invention consists in the combination, with a submarine dam, inclosure, or breakwater, of boats, supports, or floats, and a set or series of anchors to hold said boats, supports, or floats in position in a tideway or current, substantially as hereinafter set forth.

Another part of said invention consists in the combination, with a portable dam, inclosure, or breakwater, and with boats, supports, or floats to be used therewith, of chains for raising the lower portion of the dam when necessary, substantially as hereinafter more fully set forth.

Another part of said invention consists in the combination, with a portable submarine dam, inclosure, or breakwater, and with boats, supports, or floats to be used therewith, of chains to hold the bottom or lower portion of the said dam, inclosure, or breakwater against the current while it is being lowered into position for operations, or at other times, if necessary, substantially as hereinafter more fully set forth.

Another part of said invention consists in the combination, with a submerged dam, inclosure, or backwater, and with a drill-support or drill-frame attached to the lower portion or section thereof, of a drill support or frame arranged above said lower drill-support or drill-frame, substantially as hereinafter more fully set forth.

Another part of said invention consists in the combination, with a floating deck or flooring, supported above the water, and with a drill-support or drill-frame arranged in the lower portion of the stream or other water to guide the drills in proximity to the rock to be drilled, of a drill-support or drill-frame placed above said lower drill-support or drill-frame, all being arranged substantially in the same vertical plane, substantially as hereinafter more fully set forth.

Another part of said invention consists in the attachment to a floating support of the upper section of a portable and adjustable dam, inclosure, or breakwater, and the connection thereto of the lower sections, substantially as described, whereby the said floating support is made to keep the said dam, inclosure, or breakwater extended to the proper height, and to adapt it in that respect to any change (within certain limits) of the depth of the water, substantially as hereinafter more fully set forth.

Figure 2:
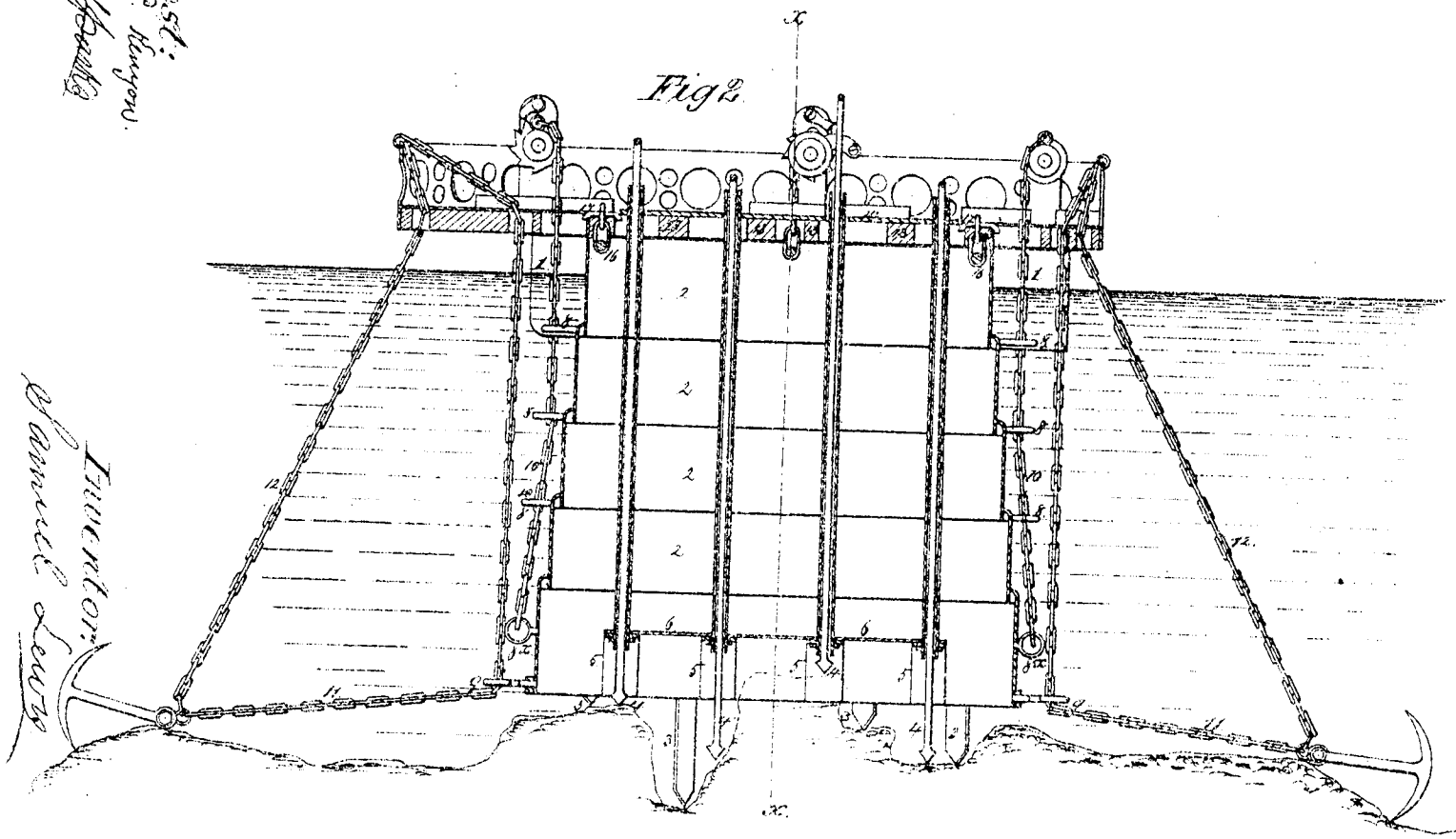

Figure 1 is a side elevation or view of the apparatus in its working position, showing the methods of anchoring, &c. Fig. 2 is a longitudinal vertical section on the plane indicated by the line *y y* drawn across Fig. 4, or, in other words, is a longitudinal vertical central section of the dam, showing the telescopic sections thereof, the position and direction of the drills, and the devices for sheathing or shortening the dam in a vertical direction. Fig. 3 is a vertical transverse section on the plane indicated by the line *x x*, as drawn across Fig. 2, showing the manner of guiding and bracing the drills and drill-tubes, the manner of suspending the dam from the main deck, and in broken lines the appearance of the dam sheathed or closed for removal. Fig. 4 is a plan or top view, showing the form of the dam in its horizontal section, the positions of the drills, the windlasses for raising the dam and for operating the anchors, and also giving a general view of the decks of the boats, supports, or floats to be used with the dam.

1 1 are two boats, of sufficient floating capacity to support the deck and the working parts of the apparatus, and to also afford sufficient resistance to the downward tendency of the draft of the cables attached to the main anchors to secure these boats in their proper position. These boats are secured together by a substantial deck, the timbers and floor of which are indicated by the numbers 13 and 14, by which deck these boats are so connected as to form substantially a single float or structure. This deck or floor has an opening in its center to admit light and access to the inside of the dam, and also to allow convenient access to the drills. This opening should be about the size of the horizontal section of the largest portion of the dam, though its size may be varied according to circumstances. Though the float or support thus formed is represented as being made up of two boats, united by a deck, this form of construction is not regarded as strictly essential so long as the support provided is sufficient for the purposes required. 2 2 are sections which form the adjustable dam, inclosure, or breakwater hereinbefore mentioned, which sections may be made of plates of galvanized iron, or of any other appropriate material, and of suitable thickness to resist such pressure or casualty as may be likely to be thrown upon them. I prefer to make these sections, and consequently the dam, in the elongated form shown in the drawings, so as to offer the least resistance to the tide or current by which the strain upon the fore and aft anchors and chains or cables by which the boats or floats are secured in position is reduced, and the general control of the apparatus facilitated. This form is not, however, imperative. To prevent the sections 2 2 from separating, and to give them additional strength, I prefer to bend inward the upper edge of each section, except the upper one, and to attach a ledge or strip to the lower edge of each section, as shown in the drawings.

If the circumstances of the intended use of the dam are such as to make the sections 2 2 bind upon each other and prevent their moving up and down within each other with sufficient freedom, friction-rollers may be interposed between the sections to facilitate the vertical extension and contraction of the dam.

In the form of construction shown in the drawings each section is provided with four eyebolts, 8 8 8 8, one at each side, and one at each end, which serve as guides to the hoisting-chains 10 10, to the lower series $8_x$ $8_x$ $8_x$ $8_x$ of which eyebolts the lower ends of these hoisting-chains are attached. The lower section of the dam is provided with four sheaves or eyebolts, 9 9 9 9, the former being preferable for the chains 11 11 to pass through. These chains are intended to extend from the deck 14 through these sheaves or eyebolts to anchors, shown in the drawings as being carried out and cast fore and aft and each side of the boats, to hold the latter in position by means of chains 12 12, the object of the chains 11 11 being chiefly to support the lower part of the dam against the current, and steady it in position while it is being lowered, and in some cases they may be used to aid in holding said lower part of the dam in position while in use, especially in positions where there is a strong current with no material variation in the depth of water.

These chains are shown in the drawings as being hooked onto the railing of the float; but in practice they are designed to be operated by windlasses similar to those shown for operating the chains 10 10. The chains 11 and 12 may be provided with separate anchors, instead of being attached to the same anchor, should circumstances render this desirable. The drills 4 4 work in tubes 7 7, which tubes are provided upon their lower ends with threads, which screw into the lower longitudinal brace 6, while the extreme threaded end of the tube receives a nut under the transverse braces 5, thus securing the braces 5 and 6 together, to form the lower drill-frame, and also at the same time securing the drill-tube in the frame thus formed. The outer ends of the braces 5 are bolted or otherwise secured to the lower section 2 of the dam, so that when this lower section is properly secured in position for drilling, it shall hold this lower drill-frame in position, and thus give a firm support to the drills in near proximity to the rock to be drilled.

The upper ends of the drill-tubes 7 7 may be permitted to slide freely in the guide-plate 18, as the distance between this guide-plate and the braces 5 and 6 is increased or diminished by the extension or contraction of the height of the dam. It is not, however, deemed essential that these tubes 7 7 should always be of the full length shown in the drawings, but a short section, sufficiently long to prevent the drill from being lifted out of it during the stroke thereof, will in many cases answer, and in some cases may, perhaps, for some reasons, be preferred; and the tube, instead of being rigidly bolted to the frame, as shown in the drawings, may be set in a rocking joint therein.

The upper section 2 of the dam is represented in the drawings as being supported in proper position by being hung to the deck by means of links and bolts 16 and 17; and for some reasons and purposes I prefer this as the best means for keeping the dam extended when in use, as, among other things, it makes the depth of the water adjust the dam to the proper height; but I do not regard this mode of support as an indispensable part of the invention. 3 3 are bars of iron fitted to slide vertically and freely in sockets attached to the lower section of the dam, and are represented as being pointed, to better take hold of the rock or bottom, upon which the dam may be let down. Said bars 3 3 are designed, by their length and free play, to adapt themselves to any inequalities or irregularities in the said rock or bottom, and to operate as self-acting anchors to hold the lower section of the dam steadily and firmly in place.

For the convenience of raising them out of the water when desirable, a cord, wire, or chain may extend from each of these self-anchors to the deck.

In using the apparatus hereinbefore described, the lower sections of the dam are drawn up around the upper section, for the convenience of transportation, and the apparatus taken to the point where it is to be used, which may be done by a tow-boat, or there may be steam-power for that purpose placed on board of the boats, supports, or floats, which form a part of the apparatus. The fore and aft and side anchors are then carried out and placed, and the chains therefrom drawn taut, so as to hold the boat in position, the boats being placed end onto the current, or to the general direction of the tide. The chains 10 are then slacked off, so as to allow the lower section of the dam to descend, care being taken to keep the chains 11 at the end toward the current or tide sufficiently taut to keep the dam in a perpendicular position, and in this way the dam is lowered till it strikes the bottom, upon which it is to operate. If the water is liable to rise, both the chains 10 and 11 should be slacked off still farther, in order to prevent their raising the dam out of place. There may, however, be cases in which it may be desirable to use the chains 11, or some of them, to hold, or aid in holding, the lower part of the dam in place.

When the dam or the lower part thereof is lowered to its place and strikes the bottom, as above stated, the self-anchors 3 3 adjust themselves to the inequalities of the rock, as hereinbefore intimated, in which position they are likely to take hold of the rock, as indicated in the drawings, and hold the dam securely in place.

When the apparatus shall have been secured in position, as above described, the drills may be put in operation, and operated by any of the known and satisfactory means for operating drills, and when the drills shall have penetrated the proper depth, the charges of powder or other blasting material may be placed in position, the apparatus removed, and the blast fired, after which the apparatus may be returned over an adjacent portion of the rock to be drilled and blasted, or over the same portion, and the dam used to protect the divers and the removal of the débris. In a tideway there will always be a tendency of the tide, when its strength increases and the tide falls, to move the boats slightly in the direction of the tide, and, as the strength of the tide diminishes during its rise, the opposite effect is produced; but this change of position and its amount may readily be detected by the working of the drills, and any variation of their shafts from a vertical position, and may be easily corrected by taking up and letting out the proper anchor-chains, as such occaion may require.

It will be obvious, from the foregoing description and the accompanying drawings, that the current will enter the dam, to some extent, through depressions in the rock under it, and also slightly through the joints of the dam, so that absolute stillness of the water inside of the dam will not be produced; nor is it anticipated or indispensable; but the intention of this dam is to form an inclosure or breakwater which shall so check the current as to facilitate drilling and other operations within it.

It will be seen also that by the construction of the dam in sections, entering one within another, and extended or shortened by a substantially-rectilinear movement, like that of drawing out or sliding in the joints of a telescope, as described, a substantial dam, inclosure, or breakwater may be produced, capable of protecting the divers and the work to be carried on within it—a result which evidently could not be realized from a series of vertically-folding plates divided in lengths, and having no support except at the top of the water.

I claim as my invention—

1. A submarine inclosure or breakwater, made in sections, one entering within another, substantially as described—that is to say, so that, by a sliding edgewise or vertical movement as contradistinguished from a folding movement, the height of the entire inclosure or breakwater may be increased or diminished by the diminution or increase of the entrance of one section within another, to adapt said inclosure to the different depths of water, or to facilitate its transportation from one place to another.

2. The combination, with a portable dam, breakwater, or inclosure, of the sliding bars or anchors 3 3, whereby said bars or anchors may be allowed to descend into or upon inequalities in the surface to be operated upon.

3. The arrangement of the open floating deck 14 in relation to a portable submarine dam, inclosure, or breakwater, substantially as described—that is to say, with the opening in the deck over the space inclosed or protected by the said submarine dam, inclosure, or breakwater, by which arrangement operations necessary within the said dam, inclosure, or breakwater may be carried on through the opening in said deck, substantially as hereinbefore set forth.

4. The combination, with a portable dam, breakwater, or inclosure, of a drill support or frame attached to said dam, inclosure, or breakwater.

5. The arrangement, in the lower portion or section of a submarine dam, breakwater, or inclosure, of a drill support or frame attached thereto.

6. The combination, with a floating deck or floor supported above the water, of a submerged drill-frame, arranged directly under said deck or floor, or under an opening through it, substantially as hereinbefore set forth.

7. The combination, with a portable submarine dam, breakwater, or inclosure, of boats, supports, or floats, and a set or series of anchors to hold said boats, supports, or floats in position in a tideway or current, substantially as hereinbefore set forth.

8. The combination, with a portable dam, breakwater, or inclosure, and with boats, supports, or floats to be used therewith, of the chains 10, for raising the lower portion of the dam when necessary, substantially as hereinbefore set forth.

9. The combination, with a portable submarine dam, breakwater, or inclosure, and with the boats, supports, or floats to be used therewith, of the chains 11, for holding the bottom of the dam against the current while it is being lowered, or afterward, substantially as hereinbefore set forth.

10. The combination, with a submarine dam, inclosure, or breakwater for breaking the force of the current, and with a drill-frame attached to the lower portion or section thereof, of a drill-frame arranged above said lower drill-frame, substantially as hereinbefore set forth.

11. The combination, with a floating deck or flooring supported above the water, and with a drill-frame arranged in the lower portion of the stream, to guide the drills in proximity to the rock to be drilled, of a drill-frame placed above said lower drill-frame, all being arranged in the same vertical plane, substantially as hereinbefore set forth.

12. The attachment of the upper section of a submarine sectional dam, inclosure, or breakwater to a floating support, and the connection of the lower sections of the said dam, inclosure, or breakwater to the said upper section, substantially as described, whereby the said floating support is made to keep the said dam, inclosure, or breakwater extended to the proper height to adapt it, in that respect, to any change (within certain limits) of the depth of the water, substantially as hereinbefore set forth.

SAMUEL LEWIS.

Witnesses:

THOS. P. HOW,

WILLIAM H. CAMMEYER.